US008887875B2

(12) United States Patent
Gherardi et al.

(10) Patent No.: US 8,887,875 B2
(45) Date of Patent: Nov. 18, 2014

(54) CALIPER BODY OF A DISC BRAKE

(75) Inventors: Pierangelo Gherardi, Bergamo (IT); Marco Caronia, Bergamo (IT)

(73) Assignee: Freni Brembo S.p.A., Bergamo (IT)

( * ) Notice: Subject to any disclaimer, the term of this patent is extended or adjusted under 35 U.S.C. 154(b) by 342 days.

(21) Appl. No.: 13/375,042

(22) PCT Filed: May 28, 2010

(86) PCT No.: PCT/IT2010/000239
§ 371 (c)(1),
(2), (4) Date: Feb. 22, 2012

(87) PCT Pub. No.: WO2010/137056
PCT Pub. Date: Dec. 2, 2010

(65) Prior Publication Data

US 2012/0145492 A1 Jun. 14, 2012

(30) Foreign Application Priority Data

May 29, 2009 (IT) .............................. MI2009A0959

(51) Int. Cl.
*F16D 65/092* (2006.01)
*F16D 55/228* (2006.01)
*F16D 55/224* (2006.01)
*F16D 55/00* (2006.01)
*F16D 121/02* (2012.01)

(52) U.S. Cl.
CPC ...... *F16D 55/228* (2013.01); *F16D 2055/0091* (2013.01); *F16D 2055/0016* (2013.01); *F16D 2121/02* (2013.01); *F16D 55/224* (2013.01)
USPC ........................................ 188/71.1; 188/72.5

(58) Field of Classification Search
CPC ................ F16D 2055/0004; F16D 2055/0016; F16D 2055/0033
USPC .......... 188/71.1, 73.1, 73.41–73.47, 369, 370
See application file for complete search history.

(56) References Cited

U.S. PATENT DOCUMENTS 3,183,999 A 5/1965 Buyze et al.
3,976,169 A * 8/1976 Ogawa ........................ 188/73.39

(Continued)

FOREIGN PATENT DOCUMENTS

EP 1 016 804 A 7/2000
EP 1 534 974 2/2004

(Continued)

OTHER PUBLICATIONS

International Search Report issued for PCT International Application No. PCT/IT2010/000239 and mailed on Aug. 26, 2010.

(Continued)

*Primary Examiner* — Christopher Schwartz
(74) *Attorney, Agent, or Firm* — Pearl Cohen Zedek Latzer Baratz LLP

(57) ABSTRACT

A caliper body (1) for a disc brake unusually capable of high structural performance and low bulk, said caliper body comprising at least one connection bridge (6) arranged straddling the connection disc of an elongated attachment side portion with an elongated non-attachment side portion; in which said elongated portions have an outer surface (13, 14) opposite the disc substantially inclined and rounded towards the disc in the radially outward direction so that the caliper body (1) viewed in the tangential or circumferential direction has a bulk with a rounded outer surface like a tortoise shell.

16 Claims, 21 Drawing Sheets

R 1 26 IN 6 4 46 3 11 12 27 7 47 50 48 5 52 101 24 2 OUT 28 25 19 42 52 C 100 40 51 8 49 A 45 T 41 C R T A

(56) References Cited

U.S. PATENT DOCUMENTS

| | | | | |
|---|---|---|---|---|
| 5,343,985 | A * | 9/1994 | Thiel et al. | 188/72.5 |
| 5,957,245 | A * | 9/1999 | Anger et al. | 188/71.1 |
| 6,708,802 | B2 * | 3/2004 | Stahl et al. | 188/71.1 |
| 7,503,437 | B2 * | 3/2009 | Toyoda et al. | 188/71.1 |
| 8,272,484 | B1 * | 9/2012 | Dennis et al. | 188/72.5 |
| 2004/0216967 | A1 * | 11/2004 | Veneziano et al. | 188/72.5 |
| 2007/0199772 | A1 * | 8/2007 | Nanri et al. | 188/71.1 |
| 2008/0185243 | A1 * | 8/2008 | Previtali et al. | 188/250 B |

FOREIGN PATENT DOCUMENTS

| | | | |
|---|---|---|---|
| EP | 1 515 061 | A | 3/2005 |
| EP | 1 911 989 | A1 | 4/2008 |
| EP | 2 022 999 | A1 | 2/2009 |
| JP | 09-257063 | | 9/1997 |
| JP | 2003 065368 | A | 3/2003 |
| JP | 2005163810 | | 6/2005 |
| JP | 2008111551 | | 5/2008 |
| JP | 2008232397 | | 10/2008 |
| WO | WO 83/01664 | A | 5/1983 |
| WO | WO 2005/078306 | | 8/2005 |
| WO | WO 2008/075386 | A | 6/2008 |

OTHER PUBLICATIONS

Japanese Office Action issued for Japanese Patent Application No. 2012-512523, mailed on Feb. 18, 2014.

* cited by examiner

CALIPER BODY OF A DISC BRAKE

CROSS-REFERENCE TO RELATED APPLICATIONS

This application is a National Phase Application of PCT International Application No. PCT/IT2010/000239, International Filing Date, 28 May 2010, claiming priority from Italian Patent Application No. MI2009A000959, filed 29 May 2009, both of which are hereby incorporated by reference in their entirety.

FIELD OF THE INVENTION

The present invention refers to a caliper body for a disc brake, for example for a motor vehicle, as well as to a caliper for a disc brake that comprises such a body.

BACKGROUND OF THE INVENTION

In particular, in a disc brake, the brake caliper is arranged straddling the outer peripheral edge of a disc brake. The brake caliper usually comprises a body having two elongated elements that are arranged so as to face opposite braking surfaces of the disc. Friction pads are foreseen arranged between each elongated element of the caliper and the braking surfaces of the brake disc. At least one of the elongated elements of the body of the caliper has cylinders suitable for receiving hydraulic pistons capable of exerting a thrusting action on the pads abutting them against the braking surfaces of the disc to exert a braking action on the vehicle.

The brake calipers are usually fixedly connected to a support structure that stays still, with respect to the disc, like for example the forks of a motorcycle or a support fixedly connected to the forks of the motorcycle.

In a typical arrangement, one of the two elongated elements has two or more attachment portions of the body of the caliper to the support structure, for example foreseeing slots or eyelets, for example arranged axially, or tnrough holes, for example arranged radially, suitable for receiving screws for fixing the caliper that, with their ends are received in threaded holes foreseen on the support of the caliper.

In a typical caliper body construction, the elongated elements arranged facing the braking surfaces of the disco are connected together by bridge elements arranged straddling the disc.

The caliper comprises different components mounted on the body such as the pistons, gaskets, drainage devices and brake fluid supply ducts.

Typically, the body of the caliper is made from metal like for example aluminium, aluminium alloy or steel. The body of the caliper can be obtained by fusion, but also by mechanical processing with chip removal, as well as by forging.

The body of the caliper can be produced either in a single piece or in a monoblock, but also in two half-calipers typically connected together along a plane that usually coincides with the middle plane of the disc on which the caliper is arranged to straddle.

In the case in which the driver of the vehicle wishes to brake or slow down the movement of the vehicle, he applies a pressure on the brake pedal, in the case of an automobile, or on the brake lever, in the case of a motorcycle. Such pressure on the brake lever, by means of a brake pump, exerts a pressure in the brake fluid that through a duct is applied to the brake fluid present in the hydraulic circuit placed inside the body of the caliper until it reaches the cylinders where the pressure is exerted on the surface of the bottom of the pistons forcing them to lock against the pads, which in turn abut against the braking surfaces of the disc. The pressure action of the brake fluid is also exerted on the bottom wall of the cylinder determining a reaction in the body of the caliper that deforms it away from the surfaces of the disc. This deformation of the body of the caliper leads to an increase in the stroke of the pistons and thus, to an increase of the stroke of the brake lever.

The body of the caliper must therefore have sufficient structural rigidity, so as to ensure that this deformation of the body of the caliper caused by the braking action is kept within tolerable values, which, as well as avoiding damage to the braking system, do not create the sensation for the driver of an unresponsive braking system, determining an extra stroke of the brake lever (creating a "spongy" sensation). This need pushes towards having extremely rigid structures for the bodies of the calipers and therefore increasing their bulk and weight.

On the other hand, the body of the caliper, being fixedly connected to the suspension of the vehicle and being arranged straddling the disc, is one of the unsuspended masses that it is wished to reduce as much as possible to increase the performance of the vehicle.

Of course, these considerations are taken to the extreme when the vehicle is a racing vehicle and the user wishes to have a braking system that is extremely responsive to his commands and at the same time extremely light so as not to penalise the performance of the racing vehicle.

Therefore, there is a need for a caliper body for a disc brake, which has improved structural characteristics for the same weight of the body of the caliper, or else with the same structural characteristics for a lower weight compared to solutions of the prior art.

Solutions for caliper bodies are known that have been specially studied to increase the characteristics of structural rigidity. For example, patent application EP-A-2022999, patent application EP-A-1534974, U.S. Pat. No. 6,708,802, patent application EP-A-1911989, patent application PCT/EP2005/050615, patent application JP-A-09257063 and patent U.S. Pat. No. 3,183,999 present solutions of bodies for brake calipers equipped with reinforcing elements arranged around Caliper bodies. In some of these known solutions, the caliper body is symmetrical according to planes passing through the axis of the disc or through the middle of the disc. In other solutions the caliper body has large and distributed windows even passing straight through that form elongated reinforcement elements arranged longitudinally to the body of the caliper.

Although satisfactory from many points of view, these known solutions nevertheless do not allow structures to be obtained that maximise the structural rigidity of the body of the caliper reducing the weight and at the same time reduce the bulk as much as possible so as to facilitate the assembly of the body of the caliper even inside wheel rims on which brake discs having a large diameter are mounted.

SUMMARY OF THE INVENTION

These and further purposes are accomplished through a caliper body as described in claim 1 attached hereto.

Further purposes, solutions and advantages are present in the embodiments described hereafter and claimed in the dependent claims attached hereto.

BRIEF DESCRIPTION OF THE FIGURES

Different embodiments of the invention are now described hereafter through examples given only as examples and not for limiting purposes, with reference in particular to the attached figures, in which.

DETAILED DESCRIPTION

Hereafter we shall describe an embodiment of a caliper body of a disc brake.

By the term "axial direction" we mean direction parallel to the axis of the brake disc that cooperates with the brake caliper comprising the caliper body arranged straddling such a brake disc.

By the term "tangential direction" we mean a direction parallel to one of the braking surfaces of the brake disc on which the caliper is arranged straddling it and perpendicular to the axial direction and tangent to any circumference with centre on the rotation axis of the disc.

By the term "radial direction" we mean a direction perpendicular to the axial direction and to the tangential direction.

Figure 1:
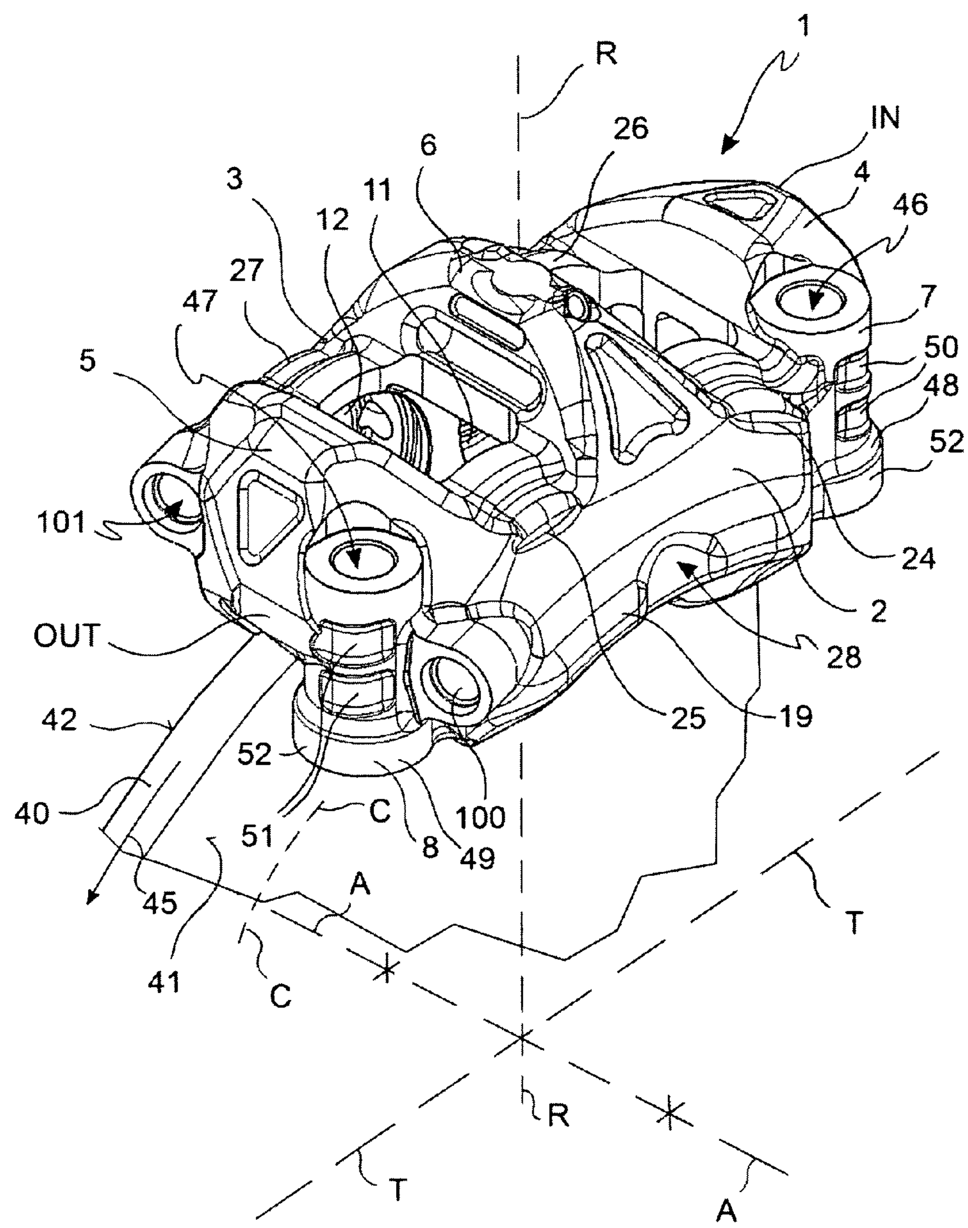
FIG. 1 shows an axonometric view from above-support side disc outlet flank of a caliper body a disc brake.
Figure 2:
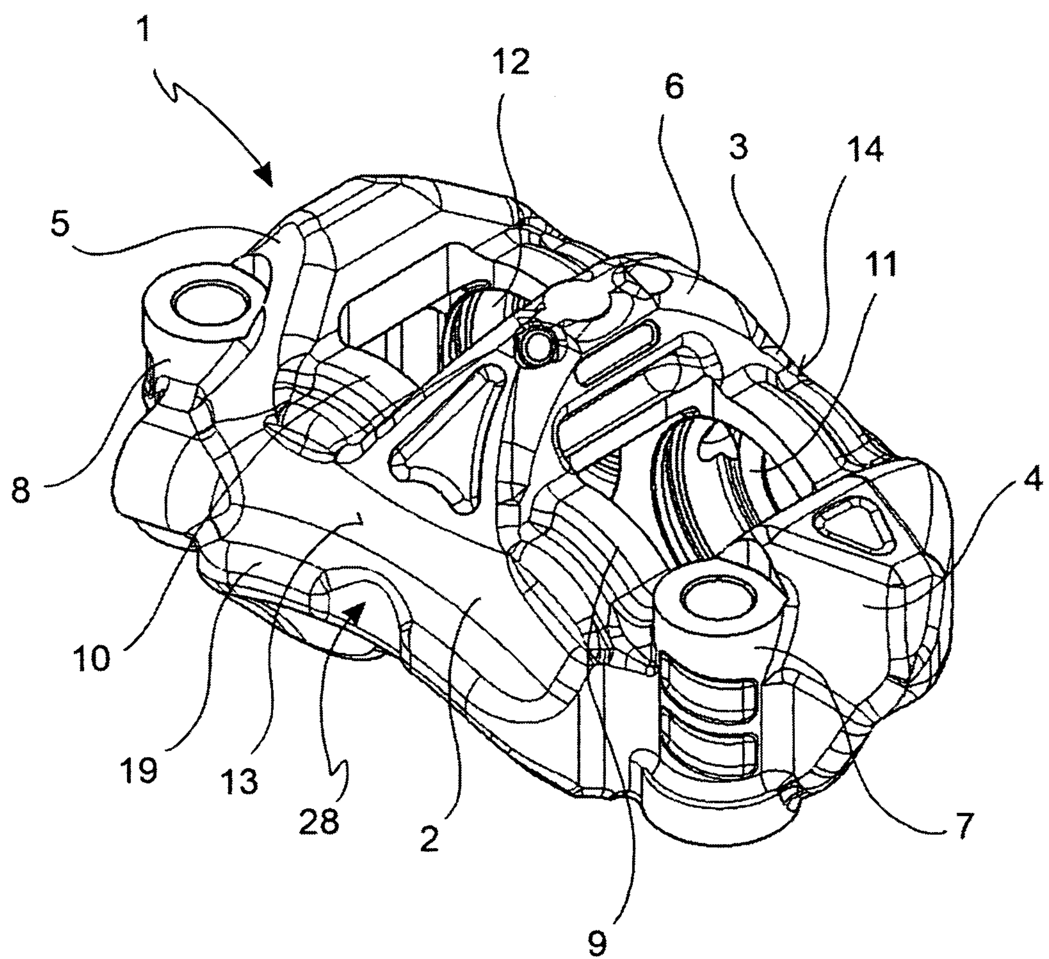
FIG. 2 illustrates an axonometric view from above-support side disc inlet flank of the caliper body of FIG. 1.
Figure 3:
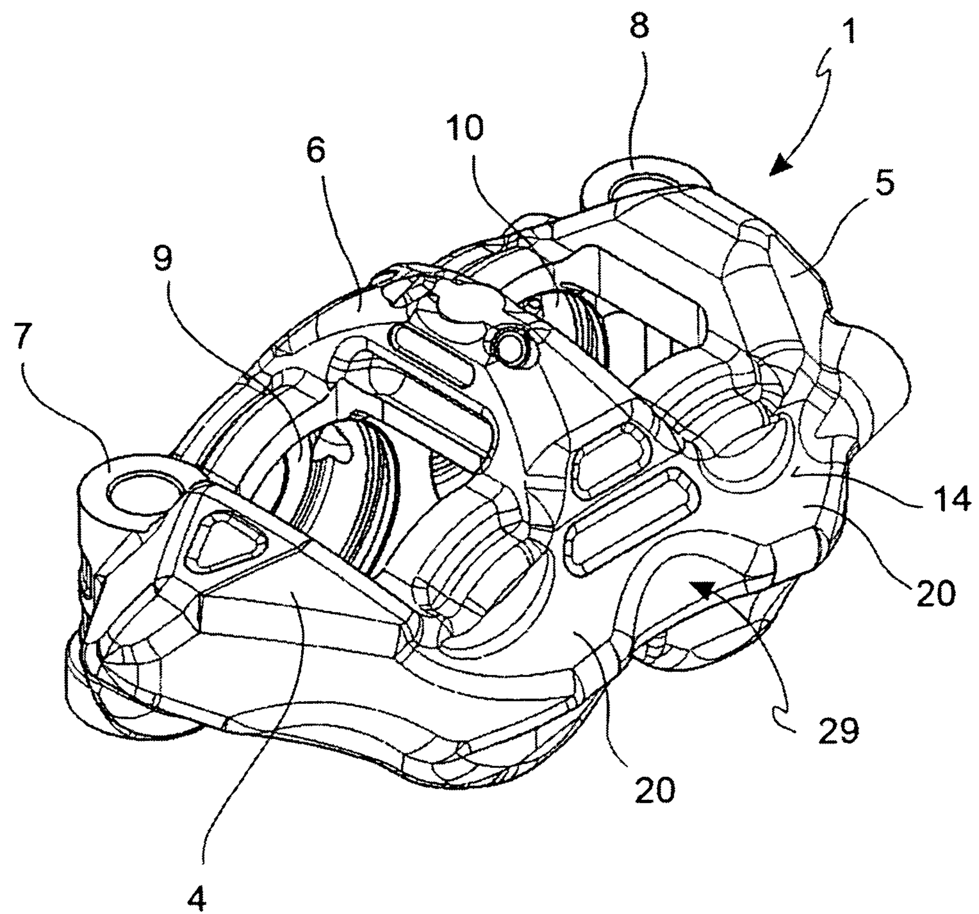
FIG. 3 shows an axonometric view from above-opposite side to the disc inlet flank support of the caliper body of FIG. 1.
Figure 4:
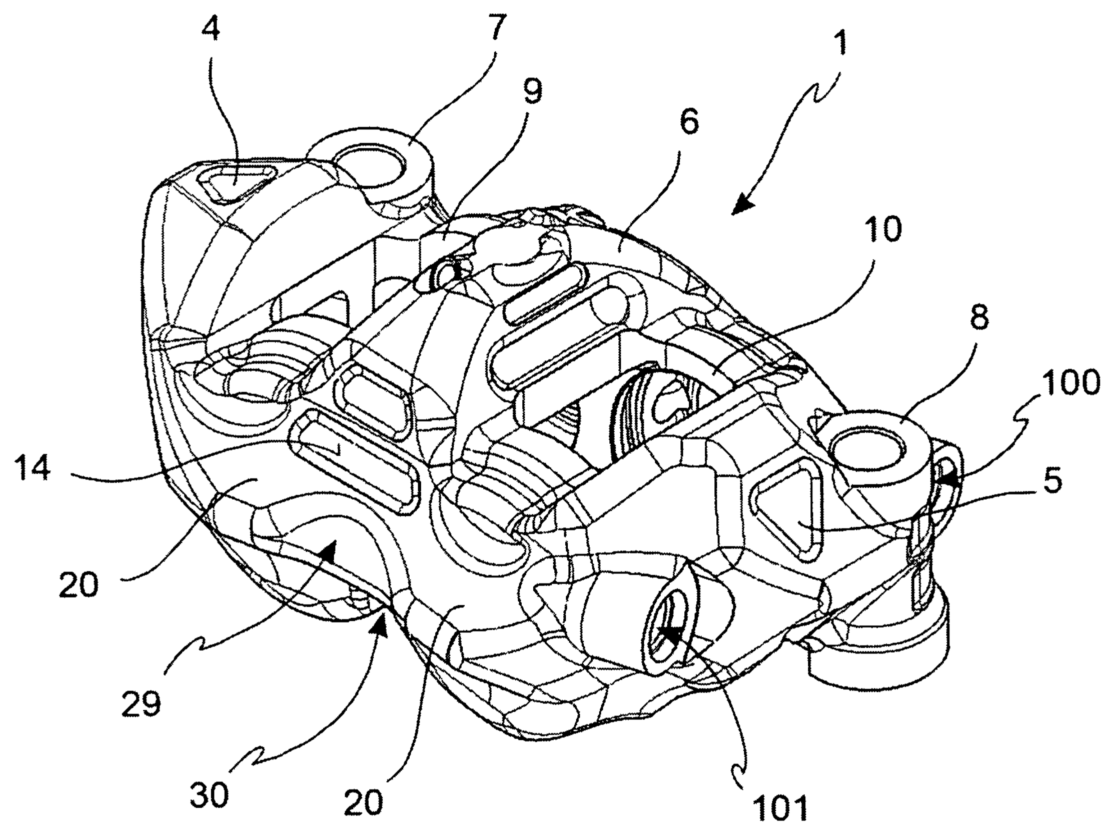
FIG. 4 shows an axonometric view from above-opposite side to the disc outlet flank support of the caliper body of FIG. 1.
Figure 10:
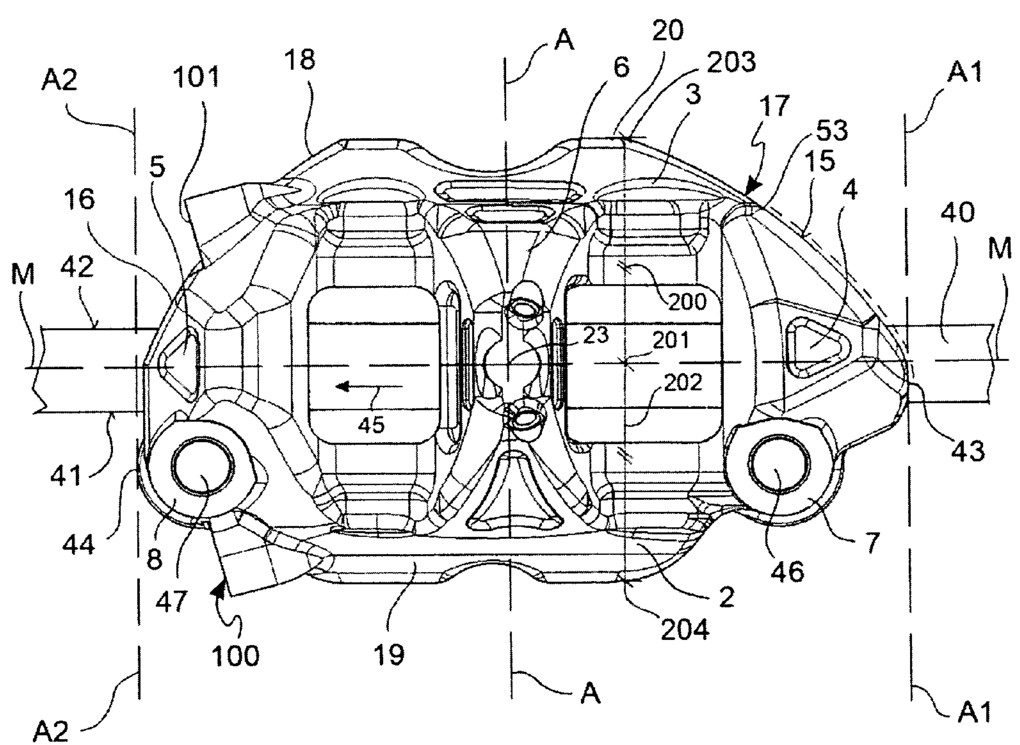
FIG. 10 shows a view from above of the caliper body of the disc brake of FIG. 1.

A disc for a disc brake, in FIG. 1 indicated with reference numeral 40, has a rotation axis that defines an axial direction A-A, as well as a tangential direction T-T or circumferential direction C-C that is parallel to one of its braking surfaces 41, 42. In particular, the tangential direction T-T or circumferential direction C-C with respect to the body of the caliper 1 has two senses that can be defined "disc inlet" and "disc outlet" as a function of the rotation (indicated with the reference arrow 45 in FIG. 1) of the disc 40 with respect to the caliper body 1 that is arranged straddling said disc 40. The disc inlet sense is the sense of the tangential direction T-T that watches the disc approach during its rotation (rotation that in FIGS. 1 and 10 is indicated with the arrow 45). The disc outlet sense is the sense of the tangential direction T-T that watches the disc move away during its rotation. With "disc inlet" portions or surfaces or parts we refer to all those portions of the caliper that face towards the tangential or circumferential direction that sees the disc approach during its rotation around the axis A-A. Said tangential or circumferential direction T-T also has a further opposite sense that defines for the portions of the caliper the disc outlet portions or parts or components or surfaces, with such a term defining all the portions of the caliper that see the disc come out from the body of the caliper arranged straddling the disc when it rotates around its rotation axis A-A. Such a tangential direction T-T has an arrangement that is perpendicular with respect to the axial direction A-A and is tangent to any of the circumferences with centre on the rotation axis of the disc. The disc 40 also defines a further direction perpendicular to the axial direction A-A and tangential direction T-T, which is the radial direction R-R. Also for the radial direction R-R it is possible to define "outer" portions, parts, components and surfaces that define all the portions of the body of the caliper that are oriented towards the opposite side of the rotation axis of the disc A-A, as well as "inner" portions, parts, component and surfaces that define all the portions of the caliper that face towards or are oriented towards the rotation axis of the disc A-A (see for example figure Relative to the arrangement of the body of the caliper 1 with respect to the disc 40 and to the suspension of the vehicle, it is also possible to define an attachment side, portions and surfaces that define all the portions of the caliper that face the support foreseen on the spindle of the vehicle or on the support connected to the forks of the motorcycle that, as well as facing support means of the caliper that are fixed with respect to he disc, also faces a first braking surface 41 of the disc facing towards the vehicle. It is also possible to define an opposite side of the body of the caliper 1 that defines portions or surfaces that are opposite to the support means of the caliper and thus to the vehicle that can be defined as non-attachment portions to the vehicle and with this defining all of the portions of the caliper that, with their surfaces face the opposite braking surface 42 of the disc for the disc brake and connect to the vehicle through bridge portions arranged straddling the disc.

As can also be seen from FIG. 10 depicting a view from above of a body of the caliper 1 arranged straddling a disc 40, it is possible to define a middle axis M-M arranged on the middle plane of the disc 40 to divide substantially the body of the caliper into two sections 200 and 202 in the axial direction of equal extension (the distance 203-201 and 201-204 is substantially equal). The intersection between the projection of the rotation axis A-A of the disc and the middle plane M-M of the disc 40 defines a centre of the caliper 23. In this view it is also possible to define two further axes parallel to the rotation axis A-A of the disc and arranged according to the axial direction: a first of these axes A1-A1 is arranged parallel to the rotation axis A-A of the disc and is tangent to the outer profile of the body of the caliper and defines the tangential end of the disc inlet flank 43. in this figure it is also possible to define a further axis A2-A2 that is arranged at h tangential end of the disc outlet flank 44. In other words, in a view from above, as depicted in FIG. 10, it is possible to see the entire body of the caliper located between two axes parallel to the rotation axis of the disc, i.e. the axes A1-A1 and A2-A2.

Therefore, said disc 40 defines an axial direction A-A that is parallel to a rotation axis thereof, as well as a tangential direction T-T or circumferential direction C-C parallel to one of the braking surfaces of the disc 41, 42 as well as a disc input direction, indicated with the reference "IN", and a disc. output direction, indicated with the reference "OUT" (with reference to the rotation of the disco given by the arrow 45 in FIG. 1 and in FIG. 10), and also a radial direction R-R perpendicular to the axial direction A-A and to the tangential direction T-T, the latter defining an outer radial sense (indicated with the reference arrow RE for example in FIG. 12) facing away from the rotation axis of the disc.

In accordance with a general embodiment, a caliper body for a disc brake comprises an elongated attachment side portion 2 that is suitable for facing towards a first braking surface 41 of a disc 40.

Again in accordance with a general embodiment of the invention, said elongated attachment side portion comprises at least two attachment portions 7, 8 suitable for coupling the body of the caliper 1 with a support thereof, not depicted.

In accordance with an embodiment, said attachment portions 7, 8 comprise an attachment portion 7 facing the disc inlet side of the body of the caliper 1, marked in FIG. 1 with the reference "IN", and an attachment portion 8 arranged at the end of the disc outlet side of the body of the caliper 1, indicated in FIG. 1 with the reference "OUT".

In accordance with an embodiment, said attachment portions 7, 8 can consist of portions that project cantilevered from the body of the caliper 1 towards the axis of the disc to define eyelets for an axial coupling with the support of the body of the caliper.

In accordance with a further embodiment, preferably the attachment portions 7, 8 comprise through holes 46, 47 defined for example by cylindrical portions 48, 49 foreseen in the elongated attachment side portion 2 of the body of the caliper 1. Such cylindrical portions 48, 49, advantageously have undercut portions 50, 51 and ribs 52 suitable for strengthening said attachment portions 7, 8 and at the same time for lightening them reducing their mass.

In accordance with a general embodiment, said caliper body 1 also comprises an elongated non-attachment side portion 3 suitable for facing the second braking surface 42 opposite the first braking surface 41 of the disc 40.

In accordance with an embodiment, each elongated portion 2, 3 houses at least one cylinder 9; 10; 11; suitable for receiving a piston for exerting a pressure on pads that can be housed between said elongated portions 2, 3 of the caliper 1 and said braking surfaces 41, 42 of the disc 40.

In accordance with an embodiment, said caliper body 1 also comprises at least one connection bridge 4; 5; 6 arranged straddling the disc 40 connecting the elongated attachment side portion 2 with the elongated non-attachment side portion 3.

Figure 12:
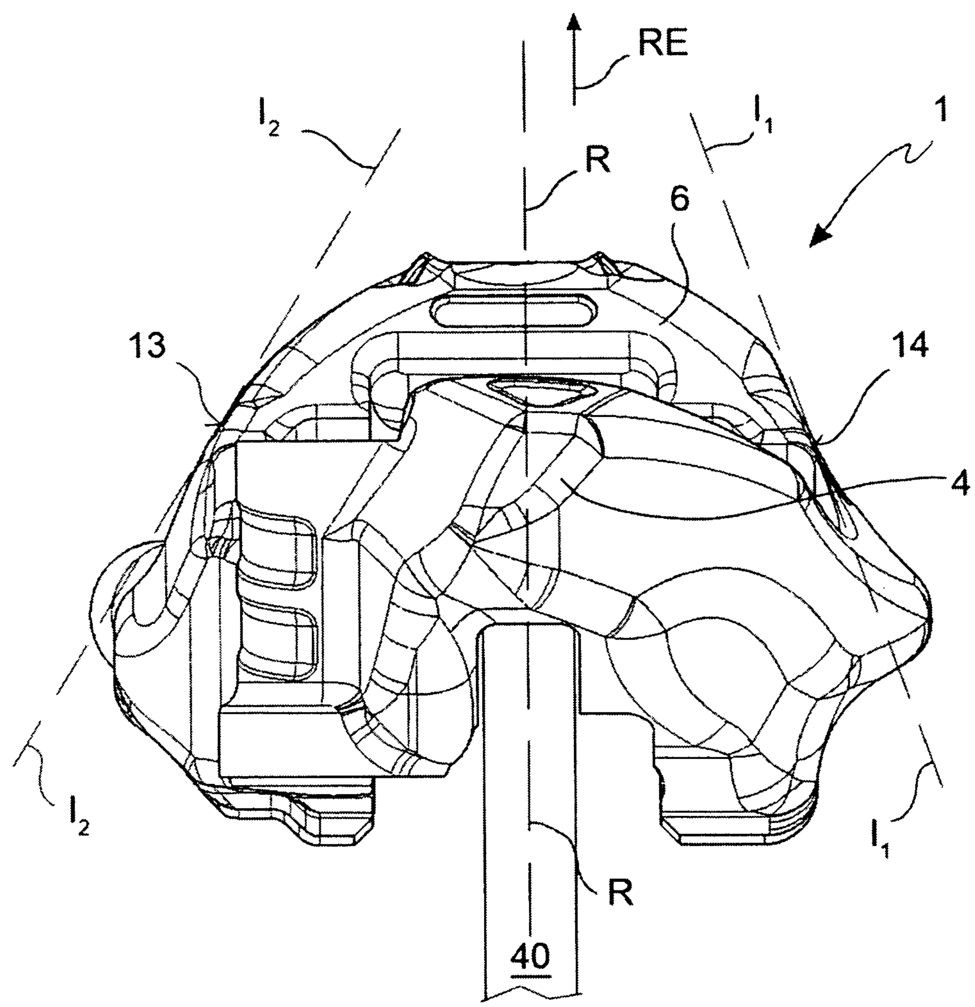
FIG. 12 shows a disc inlet side view of the caliper body of the disc brake of FIG. 1.
Figure 13:
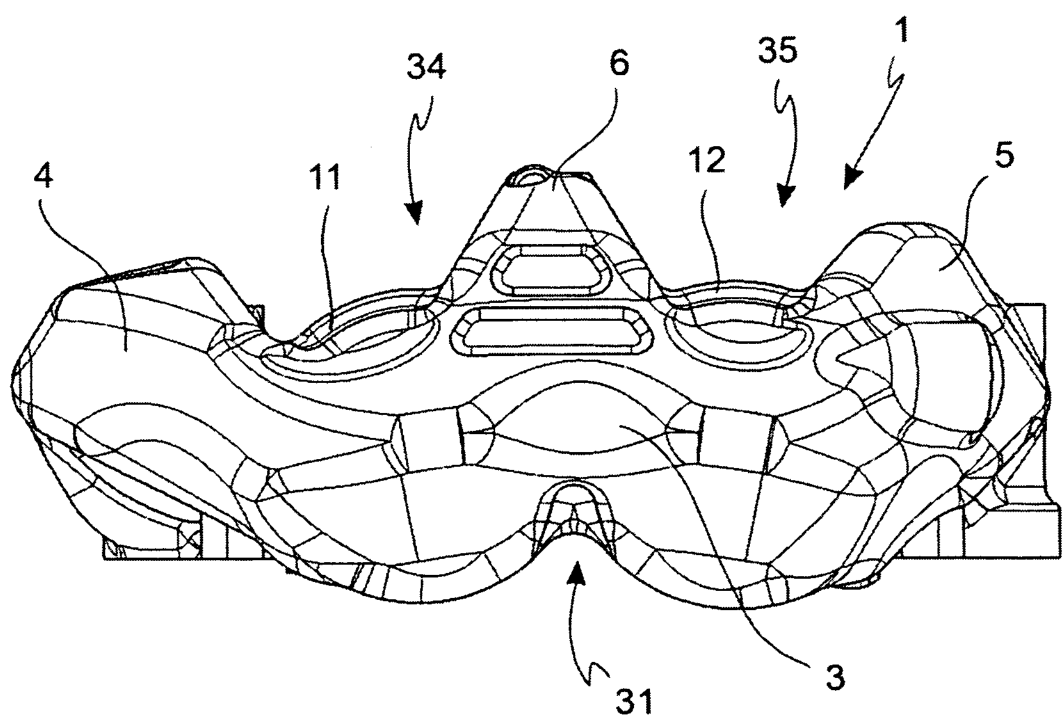
FIG. 13 illustrates a view from the back the caliper body of the disc brake of FIG. 1.
Figure 14:
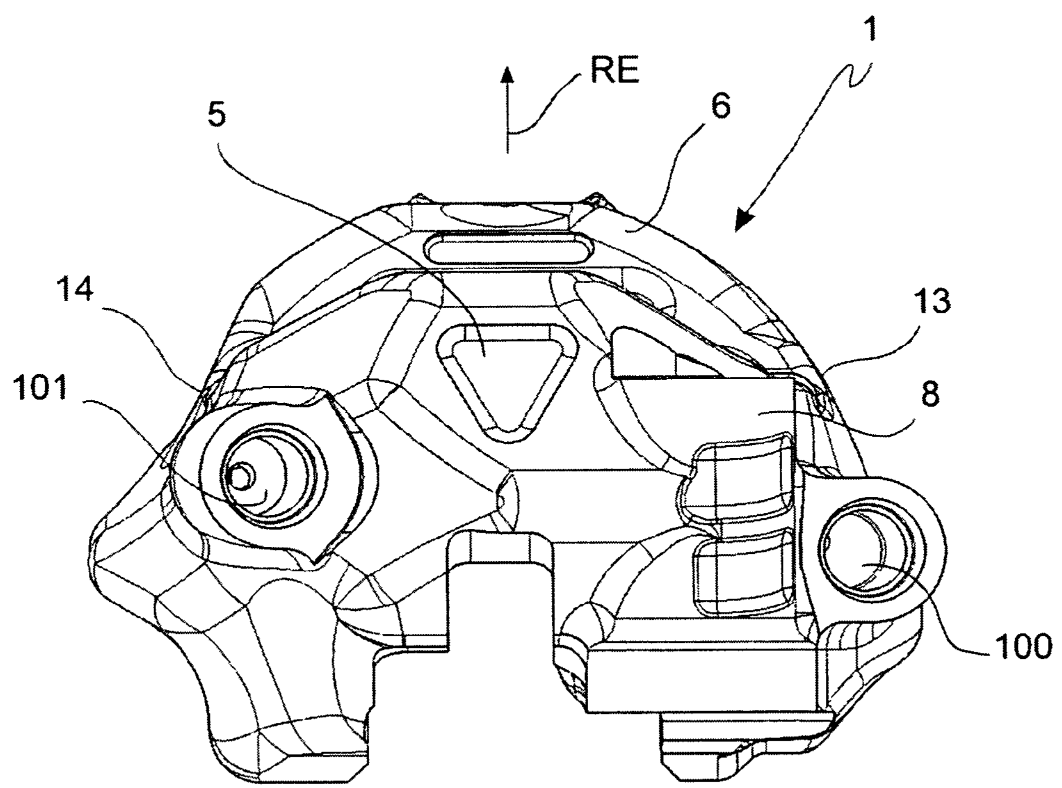
FIG. 14 shows a disc outlet side view of the caliper body of the disc brake of FIG. 1.

Advantageously, as can be seen particularly well in FIG. 12 or 14 or 16 or 17 or 19 or 21, said elongated portions 2, 3 have an outer surface 13, 14 arranged, with respect to the disc 40, outside of the body of the caliper 1 or on the side opposite the disc, said outer surface 13, 14 being substantially inclined (in FIG. 12 for example two directions I1-I1 and I2-I2 are highlighted that show the inclination of the outer surfaces 13, 14) and also, passing in the radial direction R-R from the radially inward way to the radially outward way, rounded towards the disc 40 (where the radially outward way is indicated in FIG. 12 with the reference arrow "RE"), so that the body of the caliper 1, observed in the circumferential direction C-C or tangential direction T-T, or in other words observed from a flank thereof (for example that of FIG. 12 is the disc inlet flank), has a bulk with a rounded outer surface like a tortoise shell.

In accordance with an embodiment, the body of the caliper comprises two end bridges 4, 5 connecting the elongated attachment side portion 2 with the elongated non-attachment side portion 3 arranged near to the tangential or circumferential ends or disc inlet and disc outlet ends of the elongated portions.

In accordance with an embodiment, the body of the caliper comprises a third central bridge 6 connecting the elongated attachment side portion 2 with the elongated non-attachment side portion 3, wherein said central bridge 6 is arranged substantially connecting the middles of these elongated portions 2, 3.

In accordance with a further embodiment, said caliper body 1, when seen from above or according to the radial direction looking towards the axis of the disc, for example as depicted in FIG. 10, has the end bridges 4, 5 having an outer profile, i.e. a surface facing the disc inlet or the disc outlet, which tapers or curves in passing from the elongated attachment side portion 2 to the elongated non-attachment side portion 3.

In accordance with a further embodiment, said end bridges 4, 5 have an outer profile, i.e. facing the disc inlet or disc outlet, which extends when they move away from the attachment portions 7, 8 rounding towards the centre of the caliper 23 or in other words they round or curve around the centre of the caliper 23 for their curved extension 15, 16 that in at least one bridge 7 is more than half its overall extension in the axial direction.

For example, in the embodiment depicted in FIG. 10 the disc inlet end bridge 4 has an outer surface that, in its section from the disc inlet flank tangential end 43 to the attachment 53 to the elongated non-attachment side portion 3, has a curved profile with greater extension with respect to the overall length of the end bridge 4 (the section from reference numeral 43 to reference numeral 53 is highlighted in the FIG. 10 with a broken line).

In accordance with an embodiment, the caliper body 1 viewed from above according to an inward radial direction looking towards the axis of the disc, has the end bridges 4, 5 having an outer profile that starts to taper and curve towards the centre 23 of the caliper or around the centre of the caliper 23 going from the elongated attachment portion 2 and curving in at least one of the two bridges 4 already before reaching the middle M-M of the caliper 1 in the axial direction to then reach the elongated non-attachment side portion 3.

In accordance with an embodiment viewed from above, or in the inward radial direction looking towards the axis of the disc, the body of the caliper 1 has an outer profile 17 that, with respect to its attachment portions 7, 8 in extending to form, through the bridges 4, 5, the elongated non-attachment side portion 3, forms a rounded shape, or outer profile, 18 like a tortoise shell.

Therefore, in accordance with an embodiment, the body of the caliper, both in a side view and in a view from above or below, has a curved outer profile like a tortoise shell.

For example, in accordance with an embodiment, this outer profile 17 can be seen from below where it is seen that the outer profile 17 going from the disc inlet attachment portion 7 closes rounding in continuous manner and bevelled to the point of defining the outer surface of the elongated non-attachment side portion 3 and continuing to round off to close on the disc outlet side attachment portion 8.

In accordance with a further embodiment, this outer profile 17 can be seen from FIG. 11 from below where it can be seen that the outer profile 17 going from the disc inlet attachment portion 7 slightly widens to then close rounding off in a continuous manner and bevelled to the point of defining the outer surface of the elongated non-attachment side portion 3 and continuing the round off to close on the disc outlet side attachment portion 8.

Figure 11:
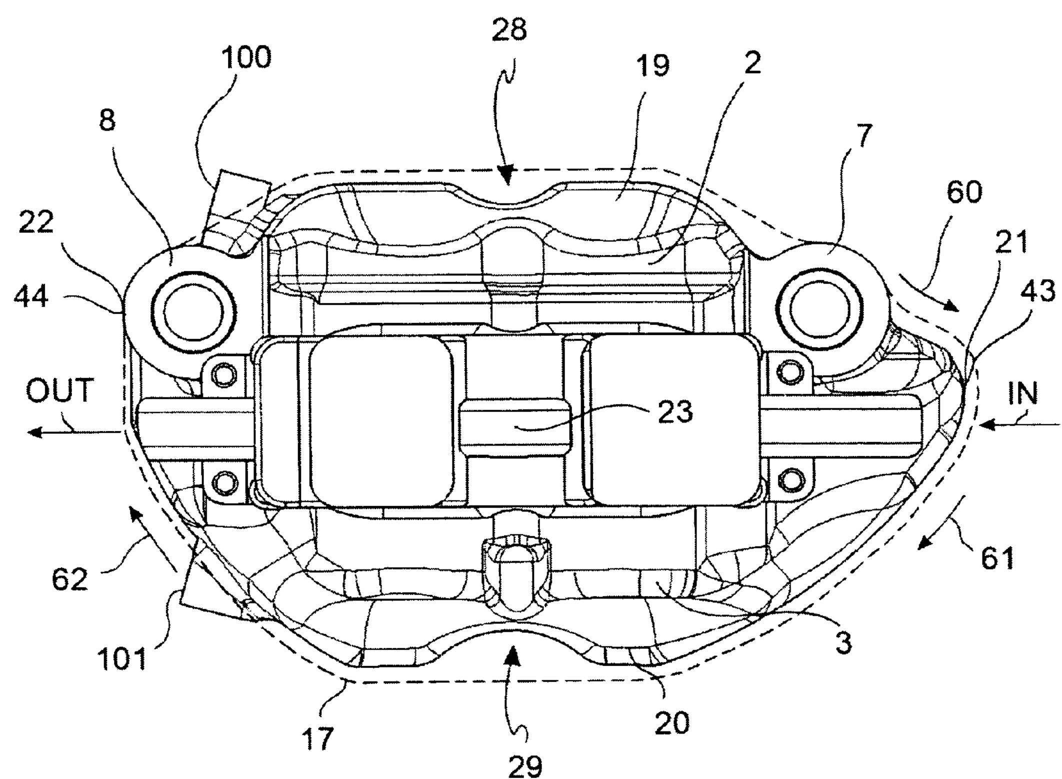
FIG. 11 illustrates a view from below of the caliper body of the disc brake of FIG. 1.

Of course, in this FIG. 11, the outer profile is depicted on the reverse and highlighted in figure through a broken line that substantially envelops the body of the caliper 1.

In accordance with a further embodiment, the body of the caliper 1 has at least one end bridge 5, preferably the end bridge of the disc outlet side "OUT" that extends from the elongated attachment side portion 2 near to the disc outlet attachment portion 8, projecting towards the elongated non-attachment side portion 3 and remaining inside the bulk of the attachment portion 8, considering this bulk in the tangential direction T-T or circumferential direction. C-C. Thanks to this characteristic, at least the attachment portion 8 is arranged at the disc outlet side tangential end 44 of the elongated attachment side portion 2 (for example, see FIG. 10 or FIG. 11).

In accordance with a further embodiment, outside of the elongated shapes 2, 3 there are reinforcement ribs 19, 20. Such reinforcement ribs 19, 20 extend in the tangential or circumferential direction along said elongated portions 2, 3.

In accordance with an embodiment, the reinforcement ribs 19, 20 taper in the axial direction and have a rounded free edge In accordance with an embodiment, the reinforcement ribs 19, 20 are joined to the elongated portions 2, 3, for example forming concavities.

In accordance with an embodiment, the reinforcement ribs 19, 20 taper in the tangential or circumferential direction passing from the disc outlet side attachment portion 8 to the disc inlet side attachment portion 7.

In other words, advantageously, the material of the reinforcement ribs 19, 20 is preferably placed up against the disc outlet side (OUT) with the reinforcement ribs being tapered going towards the disc inlet (IN).

In accordance with an embodiment, the caliper body 1, in the tangential direction T-T or circumferential direction C-C, has a disc inlet end 21, 43 and an opposite disc outlet end 22, 44.

In accordance with an embodiment, the caliper body 1 viewed from above or below has an outer profile 17 that closes after having gradually opened in the axial direction to connect the elongated non-attachment side portion 3 forming a substantially arched profile towards the opposite attachment portion 8 arranged at the disc outlet side end 44 and avoiding extending in the tangential direction T-T or circumferential direction C-C beyond said disc outlet attachment portion 8.

In accordance with a further embodiment, the caliper body 1 viewed from above or below (for example FIG. 10 and FIG. 11) has an outer profile 17 that extends beyond the disc inlet side attachment. portion 7 in the tangential or circumferential direction moving away for a short section from the centre of the caliper 23 (according to the arrow 60 of FIG. 11) towards the disc inlet "IN", to the close after having gradually opened in the axial direction to connect the elongated non-attachment side portion 3 (arrow 61) forming a substantially arched profile towards the opposite attachment portion 8 arranged at the disc outlet side end 44 and avoiding extending in the tangential direction T-T or circumferential direction C-C beyond said disc outlet attachment portion 8 (arrow 62 of FIG. 11).

In accordance with a further embodiment, each elongated portion 2, 3 comprises two cylinders 9, 10 or 11, 12 suitable for receiving pistons.

According to an embodiment, in the body of the caliper 1 there are, on the outer surface of the elongated portions 2, 3, reinforcement ribs 10, 20 that extend from the body of the caliper in the axial direction and also extend along the elongated portions 2, 3 in the tangential direction T-T or circumferential direction C-C to reinforce bottoms 24, 25 and 26, 27 of the cylinders 9, 10; 11, 12 having substantial side recesses 28, 29 towards the centre 23 of the caliper 1 passing between one cylinder and the other.

Figure 5:
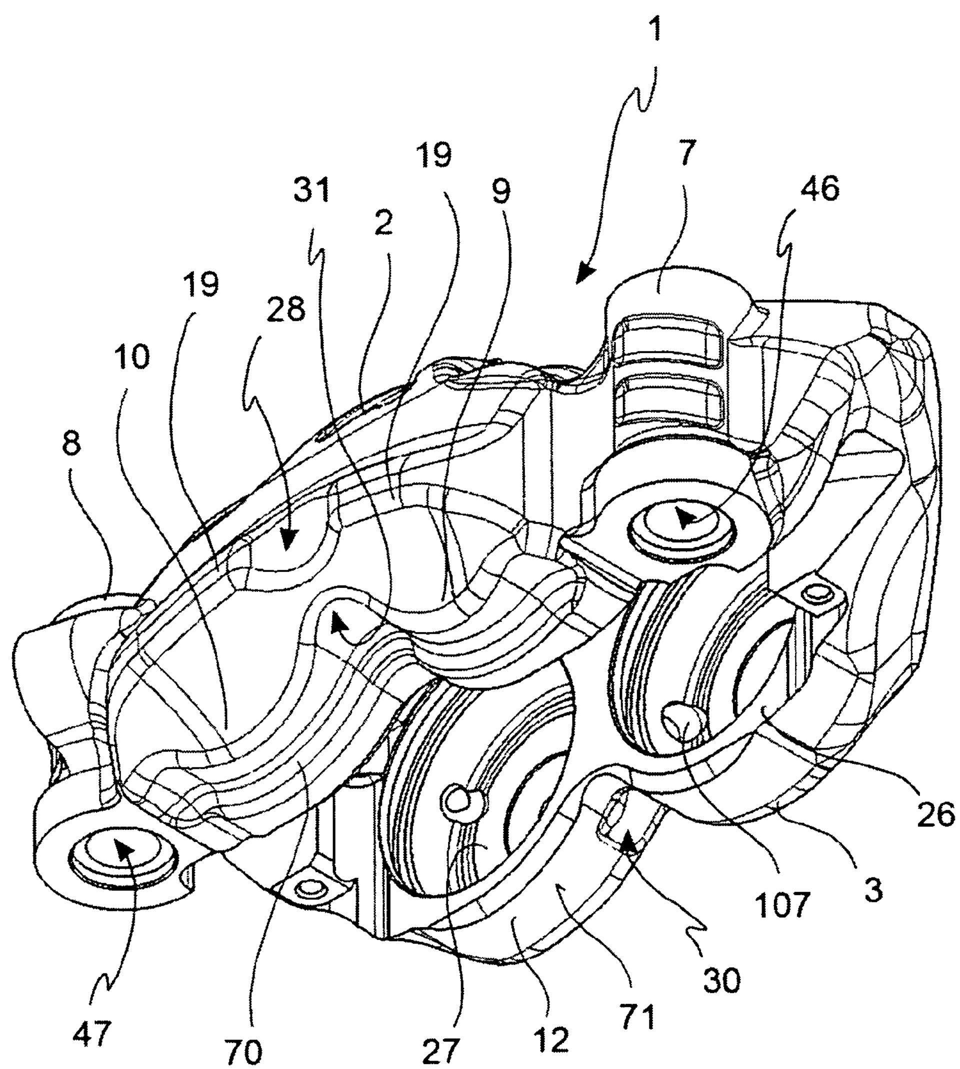
FIG. 5 shows an axonometric view from below-support side disc inlet flank of the caliper body of FIG. 1.
Figure 6:
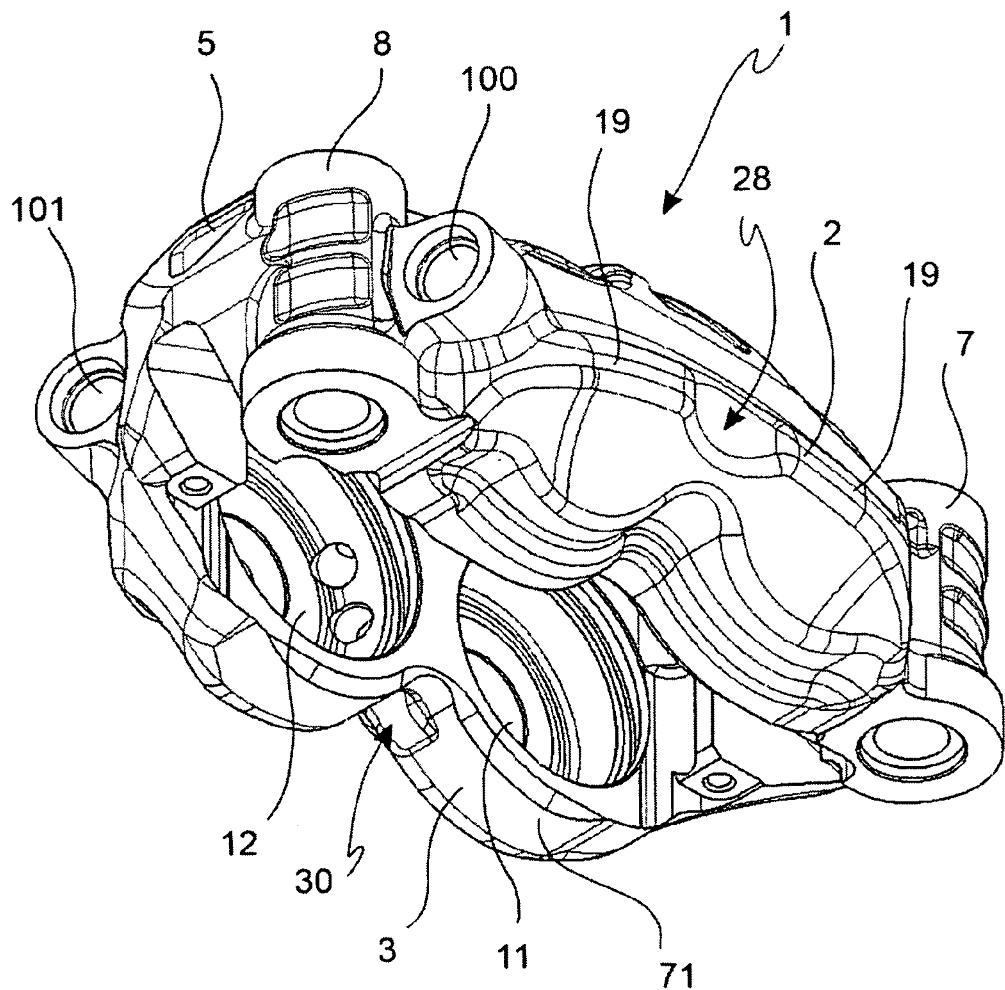
FIG. 6 illustrates an axonometric view from below-support side disc outlet flank of the caliper body of FIG. 1.
Figure 7:
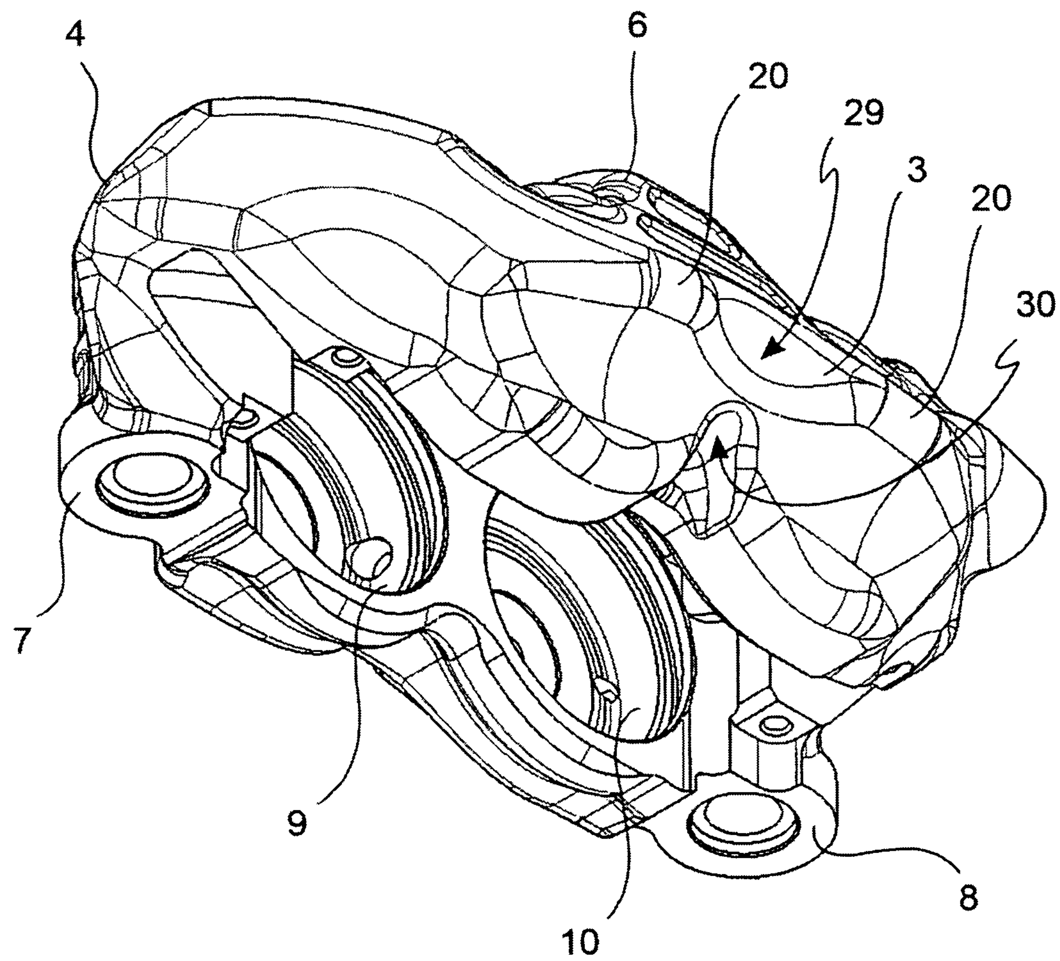
FIG. 7 shows an axonometric view from below-opposite side to the disc inlet flank support of the caliper body of FIG. 1.
Figure 8:
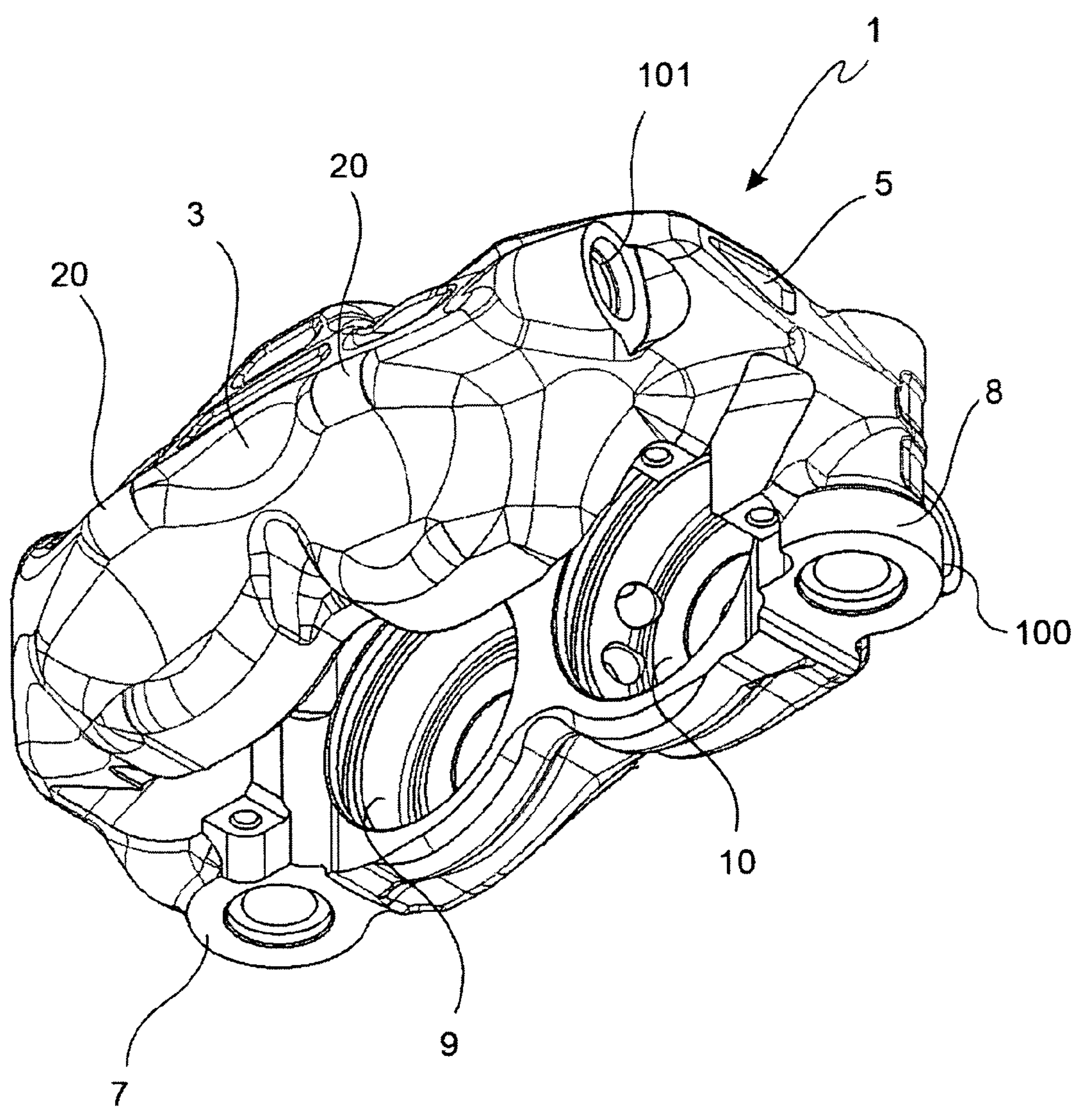
FIG. 8 shows an axonometric view from below-opposite side to the disc outlet flank support of the caliper body of FIG. 1.
Figure 9:
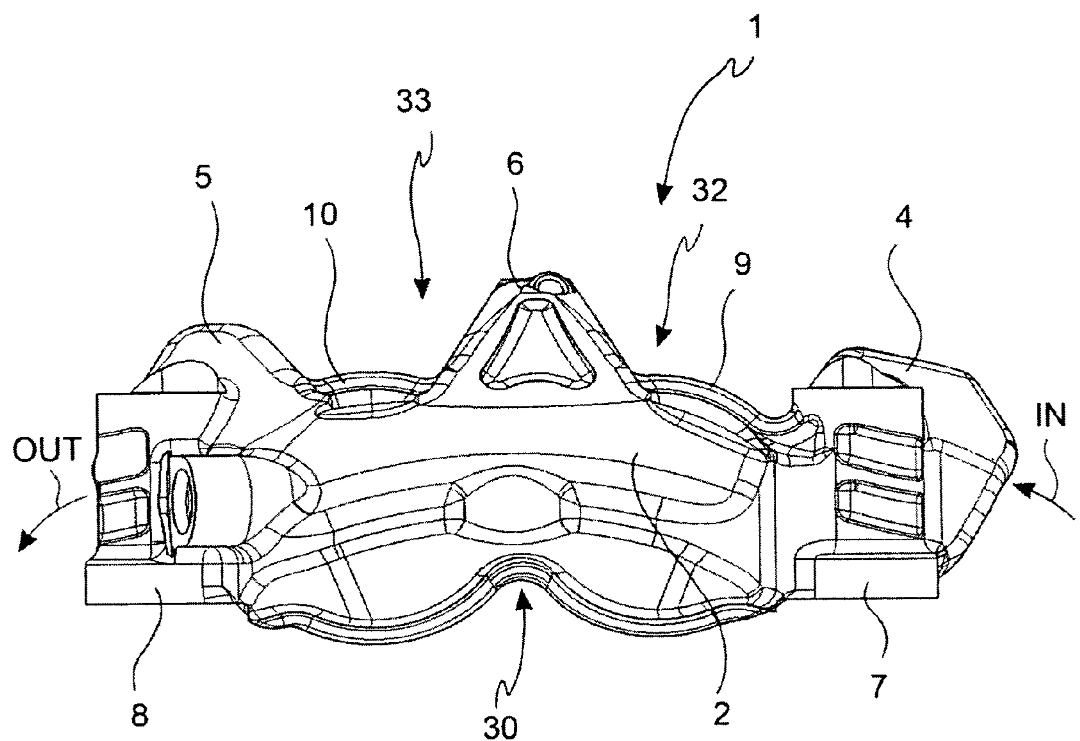
FIG. 9 illustrates a front view of the caliper body of the disc brake of FIG. 1.

In accordance with an embodiment, the radially inner side or surface 70, 71 (for example visible in FIGS. 5, 6, 7, 8, 9 and 13) of the elongated portions 2, 3 are shaped so as to follow the profile of the cylinders 9, 10 and 11, 12 forming a substantial lower recess 30, 31 in the radial direction between the cylinders arranged housed in the same elongated portion 2, 3 (see for example FIG. 5).

In accordance with an embodiment, the elongated portions 2, 3 and the bridges that connect the 4, 5 and 6 are shaped so as to leave substantial portions of the cylinders 9, 10 and 11, 12 uncovered (see for example FIGS. 1, 2, 3, 4, 9 and 13).

In accordance with an embodiment, the body of caliper 1, between the bridges 4, and 6 connecting. the elongated portions 2 and 3, has upper recesses 32, 33 and 34, 35 in the elongated portions 2, 3 so as to highlight the shape of the cylinders 9, 10 and 11, 12 in the upper or radially outer surface of the body of the caliper.

In accordance with a further embodiment, the body of the caliper 1 comprises ducts 36, 37, 106, 107, 108, 100, 101, 114, 115 and 116 for distributing the brake fluid inside the caliper body 1 suitable for reaching the inner chambers defined by the cylinders 9, 10 and 11, 12 and exerting a pressure on the bottoms of the pistons to press the pads against the braking surfaces 41, 42 of the disc 40.

Figures 15, 16:
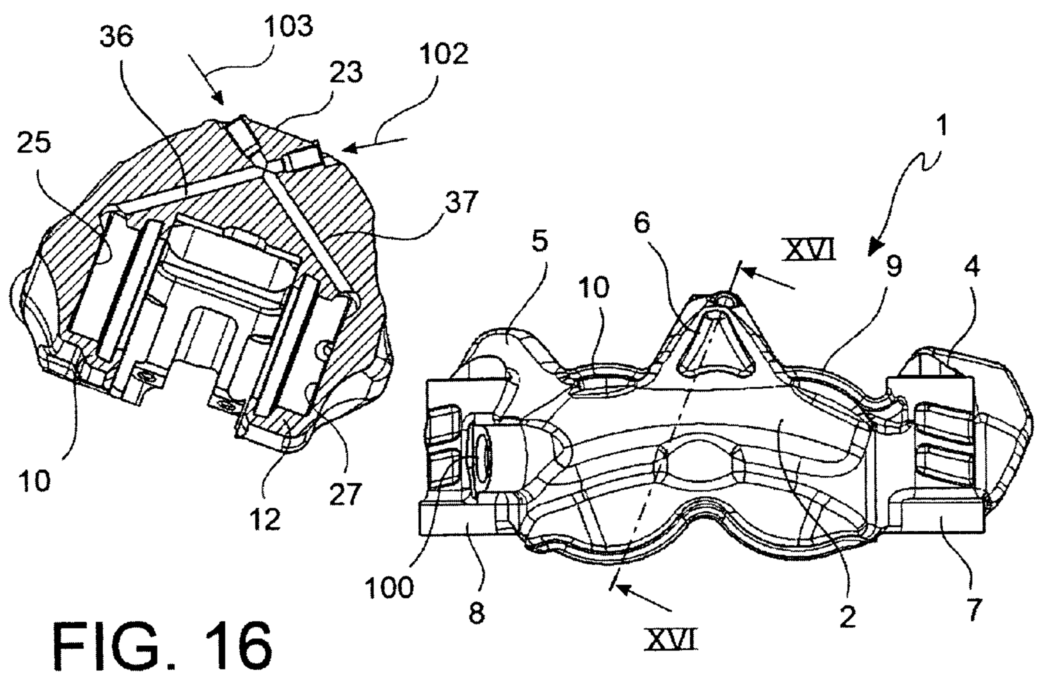
FIG. 15 illustrates a front view of the caliper body of the disc brake of FIG. 1 indicating the section line XVI-XVI.
FIG. 16 illustrates the section according to the line XVI-XVI of the caliper body of FIG. 15.

In accordance with an embodiment, in particular as can be seen from FIG. 15 and from the section represented in FIG. 16, the body of the caliper 1 comprises bridge ducts 36, 37 for the brake fluid that are arranged inside the central bridge 6 so as to stay in the arched profile of the bridge 6 to reach, from a portion near to, the centre of the caliper 23, at least one chamber defined by a cylinder 10, 11 near to a bottom 25, 27 thereof.

Thanks to the arched shape of the outer surface of the bridge 6 it is possible to make these ducts 36, 37 without significantly weakening the body the caliper.

In accordance with an embodiment, the body of the caliper 1 is a monoblock body or in other words in a single piece, for example obtained by fusion or by chip removal or by forging of aluminium or aluminium alloy.

In accordance with an embodiment, inside the body of the monoblock caliper 1 ducts are made take pressurised fluid from a fluid inlet 100 up to the chambers defined by the cylinders 9, 10 and 11, 12. Preferably, the inlet 100 is arranged on the assembly side elongated portion 2, advantageously near to the disc outlet side attachment portion 8.

In accordance with a general embodiment, the ducts inside the monoblock caliper body 1 are made through perforation or boring, preferably through the fluid inlet 100, as well as an outlet 101 for connecting to a drainage device and, advantageously from the openings defined by the cylinders 9, 10 and 11, 12 suitable for housing and extracting the pistons, as well as preferably, to place in communication the ducts made inside the elongated attachment side portion 2 with the ducts made inside the elongated non-attachment side portion 3 through holes made in a bridge, for example in the central bridge 6.

In accordance with an embodiment, these ducts for supplying pressurised fluid have a divided configuration consisting of portions of rectilinear sections obtained as a consequence of the perforations.

In accordance with an embodiment, for example, as depicted in FIG. 15 and in the section 16, the defined chambers of the cylinders 10 and 12 are placed in communication with one another through holes made in the central bridge 6 obtained with perforations 36, 37 that join together the portions near to the bottom 25, 27 of the cylinder. The ends of the perforations foreseen in the outer surface of the bridge, on the side from which the perforating tip entered, are widened and threaded so as to be able to be closed with plugs. Preferably, the ducts are made with perforations by introducing a tool as indicated by the arrows 102 and 103 of FIG. 16.

Figures 17, 18:
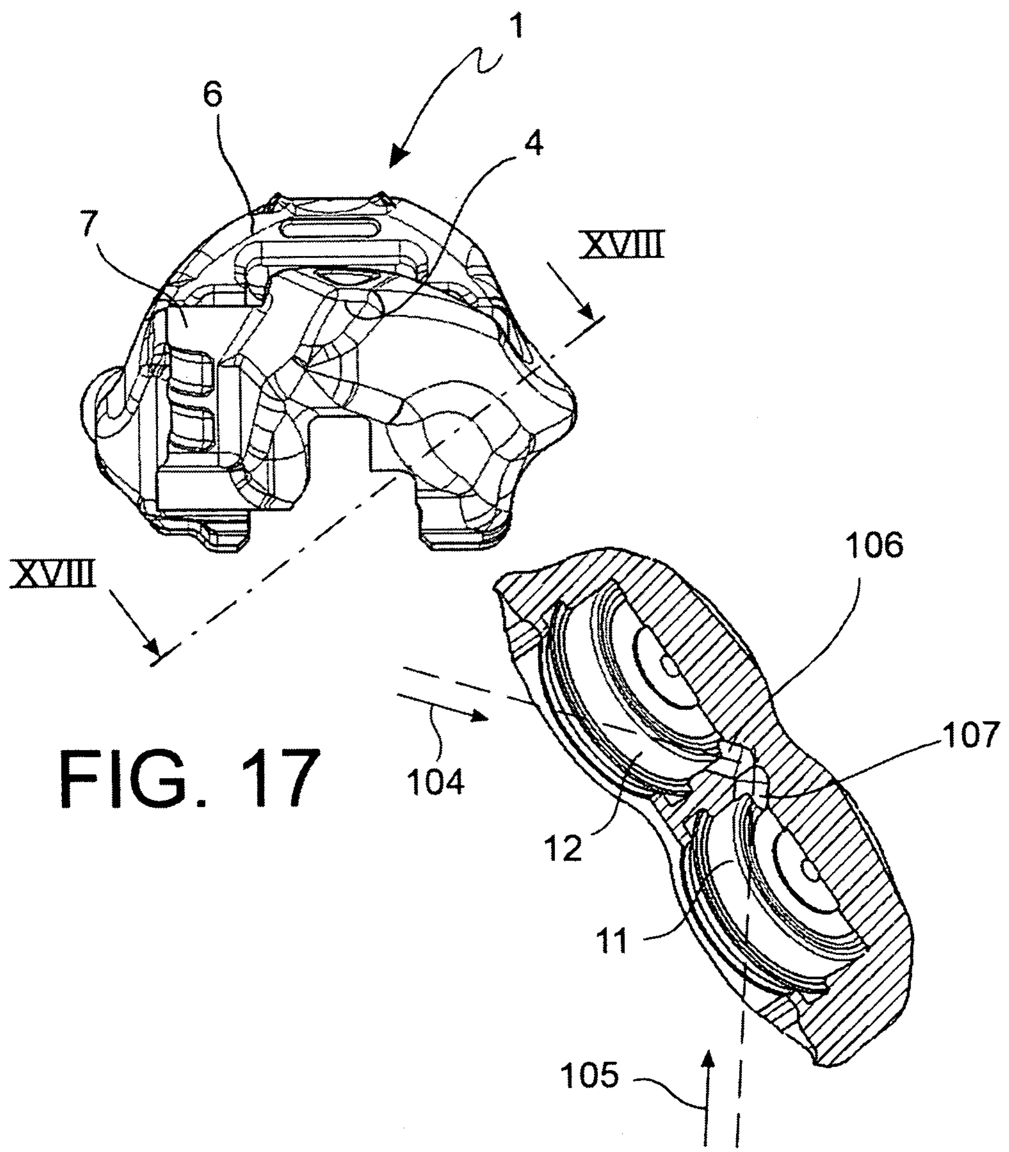
FIG. 17 shows a disc inlet side view of the caliper body of the disc brake of FIG. 1 indicating the section line XVIII-XVIII.
FIG. 18 illustrates the section according to the line XVIII-XVIII of the caliper body of FIG. 17.

As can be seen from FIGS. 17 and 18, the pressurised fluid that through the ducts 36 and 37 goes from the chamber defined by the cylinder 12 to the chamber defined by the cylinder 10, passes to the cylinder 11 through a duct made with converging perforations 106, 107 made through the mouths of the chambers defining the cylinders 11 and 12, as indicated by the arrows 104 and 105 of FIG. 18.

Figures 19, 20:
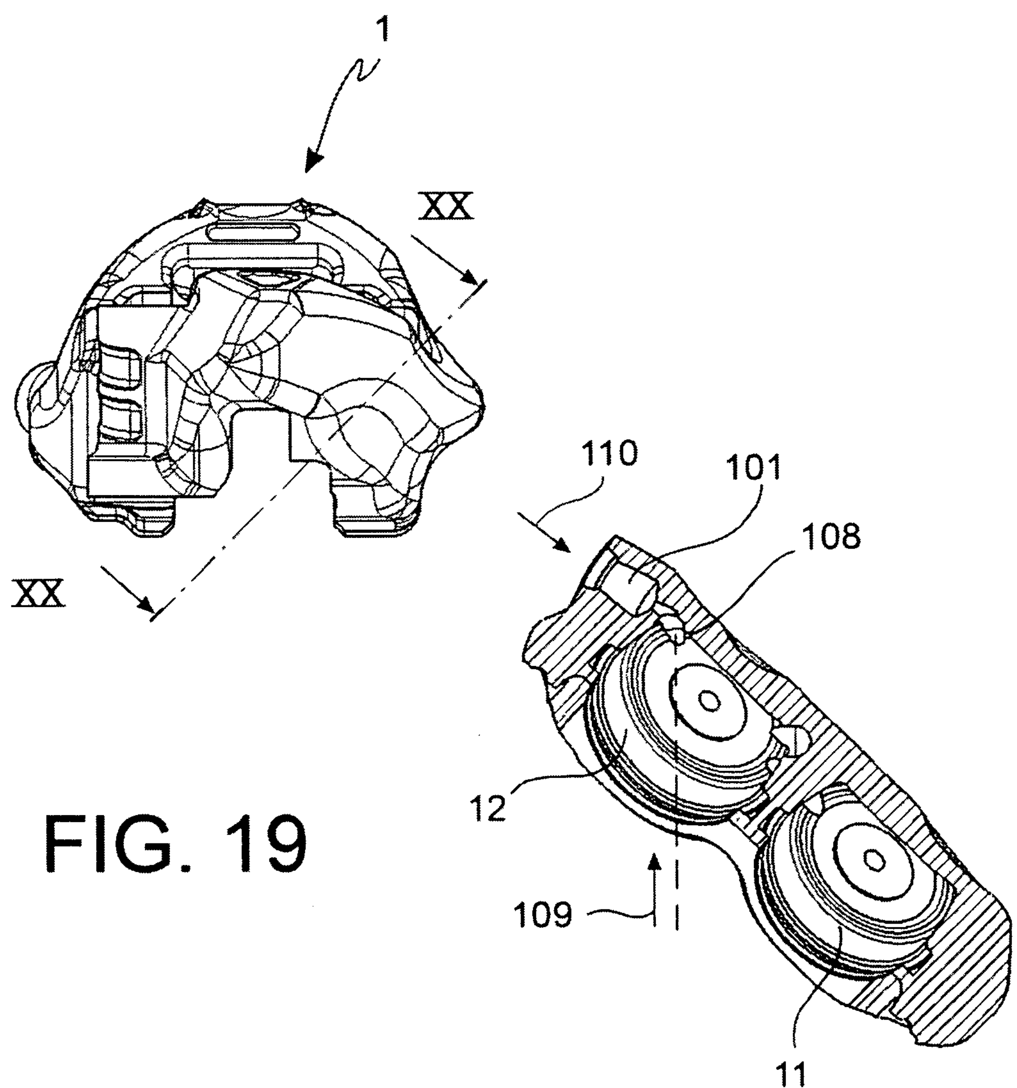
FIG. 19 shows a disc inlet side view of the caliper body of the disc brake of FIG. 1 indicating the section line XX-XX.
FIG. 20 illustrates the section according to the line XX-XX of the caliper body of FIG. 19.

As can be seen from FIG. 19 and from the section 20, the chamber defined by the cylinder 12 is placed in communication with the opening for coupling with a drainage device 101 through a perforation 108 again made by the mouth of the chamber defined by the cylinder 12 converging with the perforation made to obtain the opening for coupling with the drainage device 101.

Figures 21, 22:
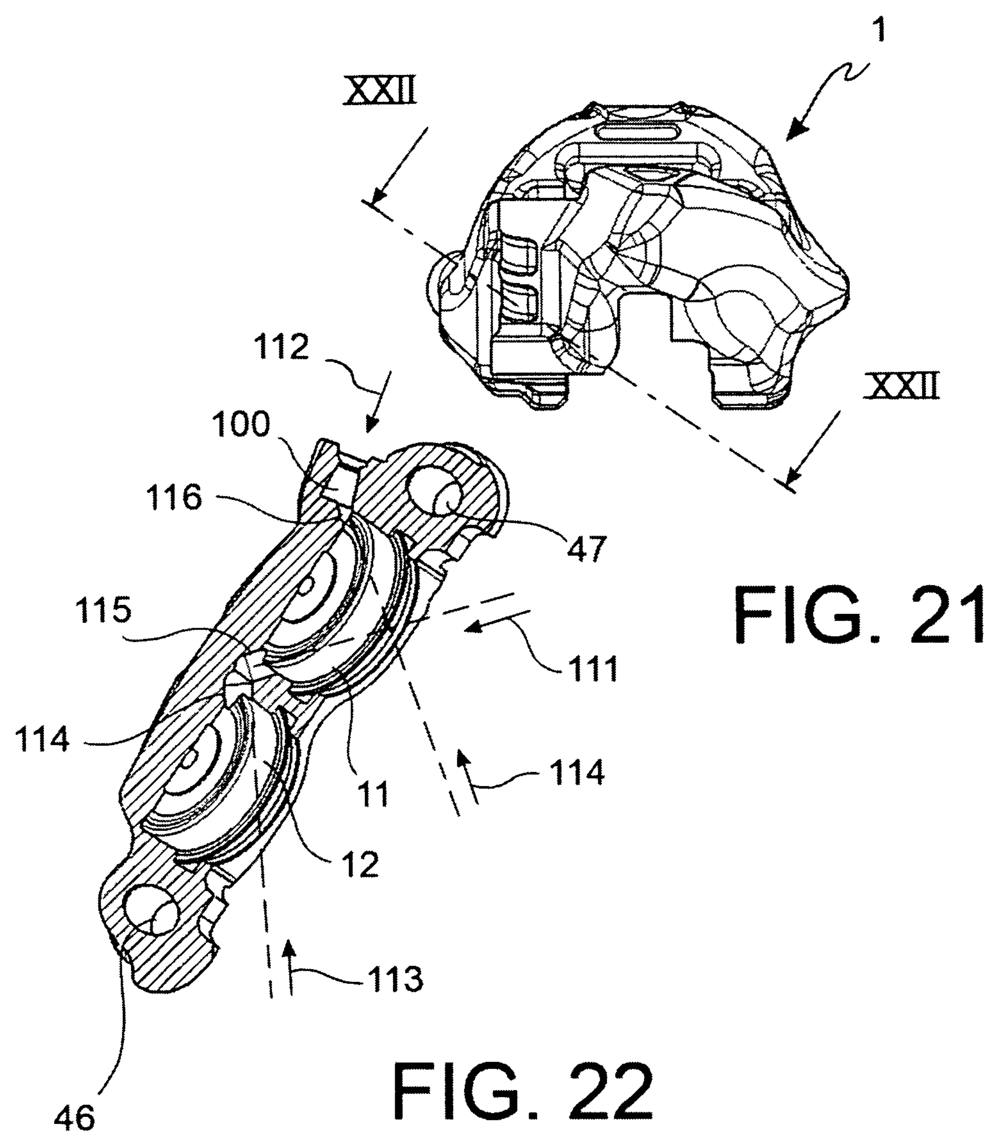
FIG. 21 shows a disc inlet side view of the caliper body of the disc brake of FIG. 1 indicating the section line XXII-XXII.
FIG. 22 illustrates the section according to the line XXII-XXII of the caliper body of FIG. 21.
Figure 23:
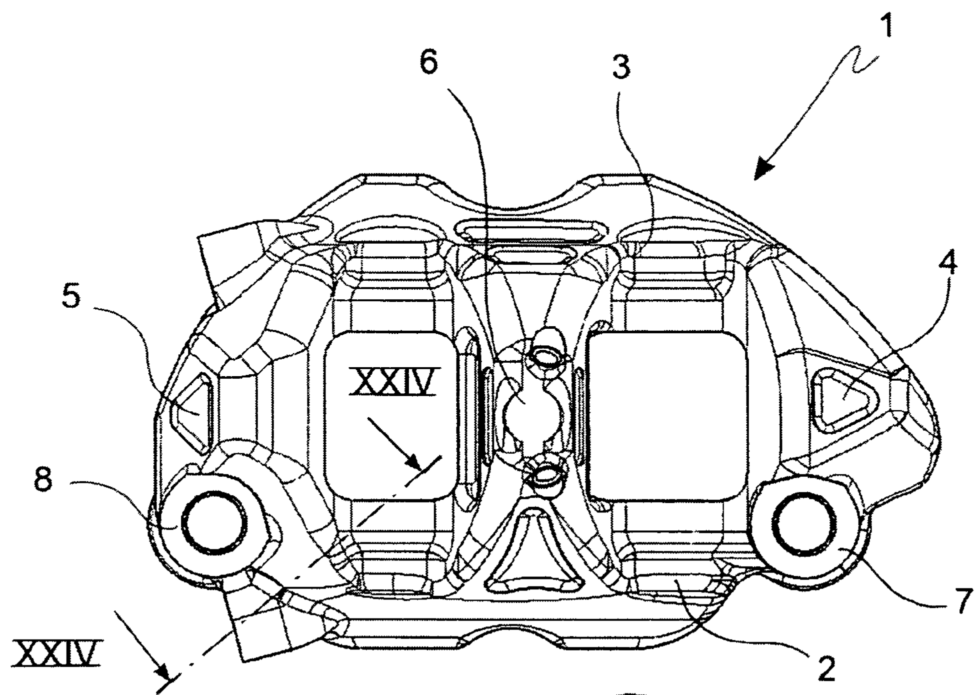
FIG. 23 shows a view from above of the caliper body of the disc brake of FIG. 1 indicating the section line XXVI-XXVI.
Figure 24:
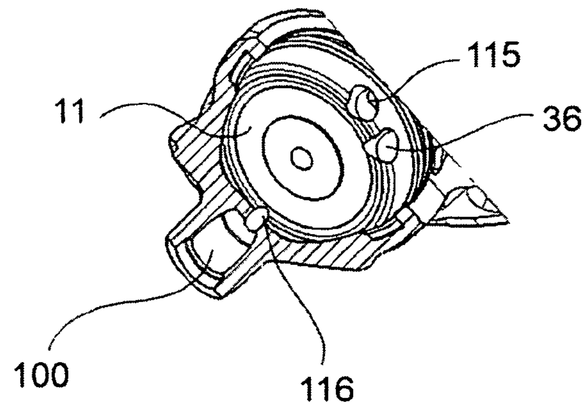
FIG. 24 illustrates the section according to the line XXVI-XXVI of the caliper body of FIG. 23
Figure 25:
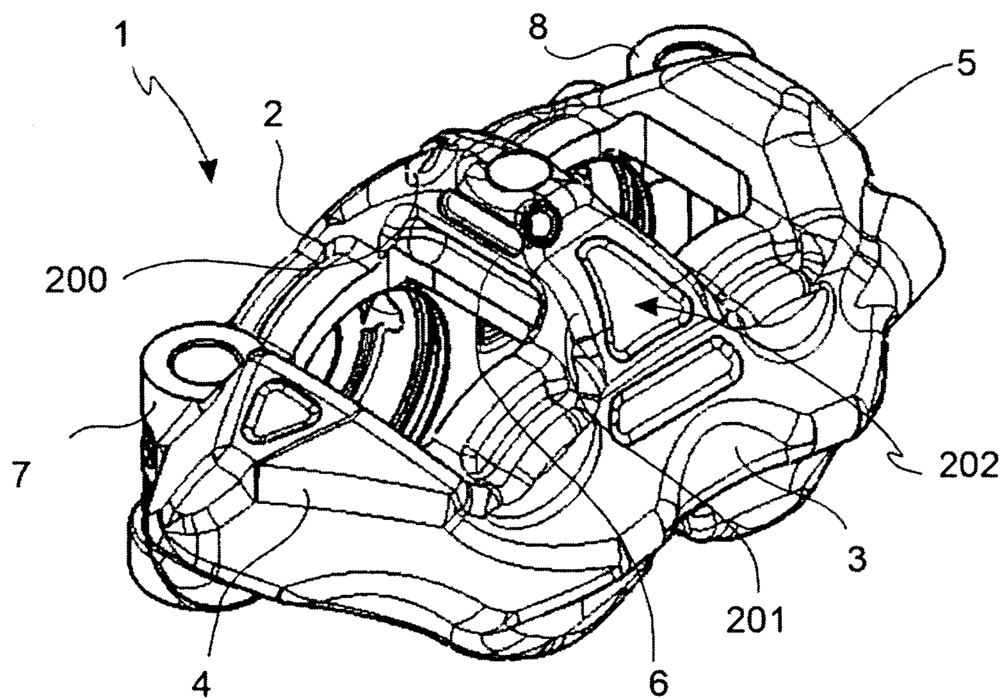
FIG. 25 illustrates a perspective view from the disc inlet side in a caliper body according to a further embodiment, in which the elongated portions are connected by a central bridge having an non-attachment attachment side outer portion undercut or lowered.
Figure 26:
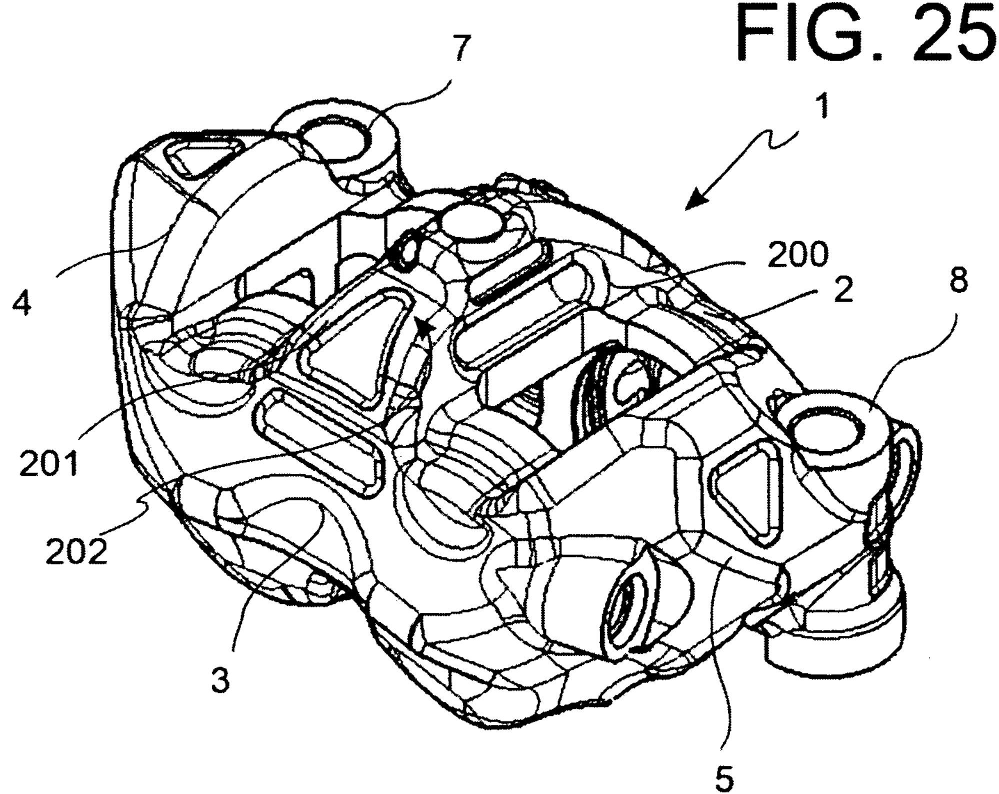
FIG. 26 illustrates a perspective view from the disc outlet side of the caliper body of FIG. 25.
Figure 27:
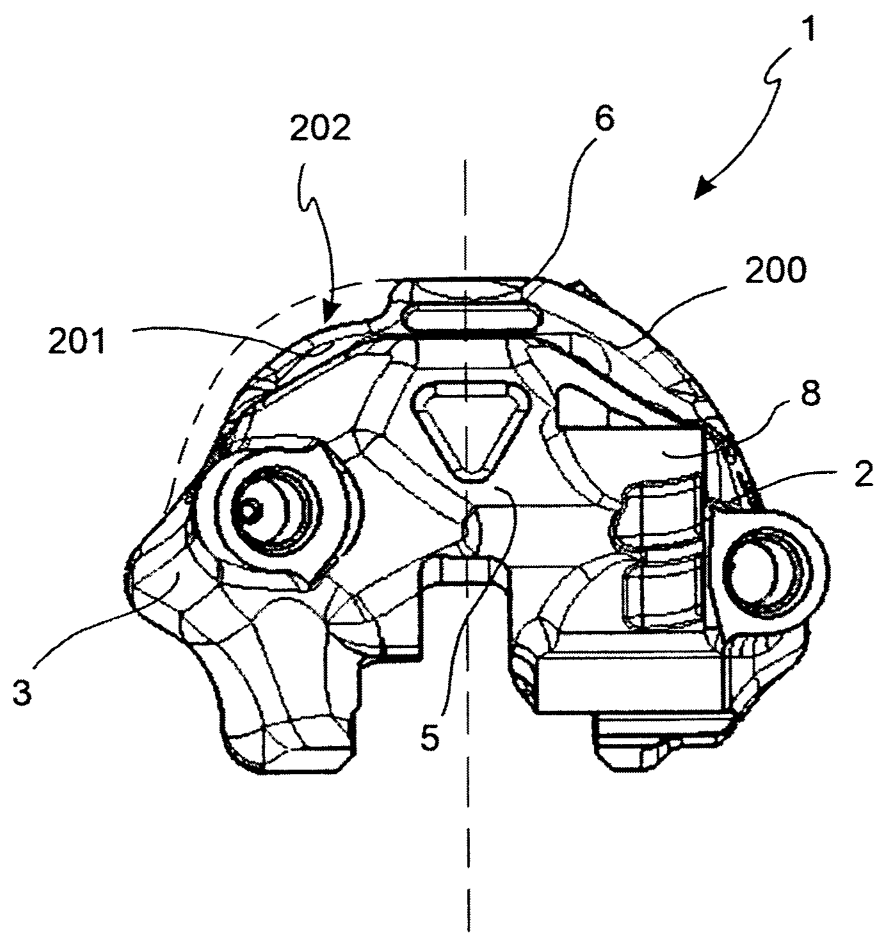
FIG. 27 illustrates a side view from the disc outlet side of the caliper body of FIG. 25.

As can be seen from the section of FIG. 20, the ducts obtained with the perforations 108 and 110 are made by inserting the tool as indicated by the arrows 109 and 110 of FIG. 20, As can be seen from FIG. 21 and from the section 22, the chambers defined by the cylinders 11 and 12 are also placed in communication through the ducts made with perforations 114 and 115 obtained by inserting the tools as indicated by the arrows 111 and 113 through the mouths of the chambers defined by the cylinders 11 and 12. The inlet for the fluid 100 is placed in communication with the chamber defined by the cylinder 11 through a perforation 116 obtained again by introducing the tool through the mouth of the chamber defined by the cylinder 11.

Thanks to the provision of a caliper body as defined above it is possible to obtain a structure that is particularly resistant to the high stresses generated sudden braking, for example like in racing vehicles, in particular like in motorcycles from the Moto-GP category.

At the same time, thanks to the characteristics of the caliper body described above, the caliper stressed. with maximum braking will have an extremely low deformation text will avoid undesired travels of the brake lever giving the user a sensation of extreme responsiveness of the braking system.

At the same time, thanks to the caliper body as described above, the overall weight will be lower.

For example, from a test carried out using a caliper made according to the state of the art compared with the solution described here, it emerged that by measuring the rigidity of the caliper body evaluated based on the amount of fluid that the caliper absorbs at the maximum use pressure on the vehicle, the caliper shows an increased rigidity of 1-5% compared to a reduction of the weight by about 10-15%.

Moreover, thanks to the caliper body, as described above it is possible to substantially reduce, for the same, characteristics of rigidity or at the same weight, the overall, bulk.

In accordance with a further embodiment, a caliper body 1 comprises elongated portions 2, 3 connected together by a third central bridge 6. Said central bridge, viewed in the tangential or circumferential direction, has a bulk with a rounded outer surface like a tortoise shell. In accordance with a further embodiment, said central bridge 6 with respect to a middle plane of the disc on which the body of the caliper is arranged to straddle it, or plane parallel to the braking surfaces of the disc passing through the middle of the body, is divided into two parts 100, 101. A first part 100 of the central bridge 6 is connected to the elongated attachment side portion, a second part 101 of the bridge is connected with the elongated non-attachment side portion. Said second part 101 of the central bridge 6 connects to the elongated non-attachment side portion and is in its radially outer surface undercut forming a recess 102 or a lowering that is suitable for making it easier to dismount the wheel of the vehicle, further reducing the radial bulk of the caliper body.

A man skilled in the art can bring modifications, adaptations and replacements of elements with others that are functionally equivalent to the embodiments of the device described above, in order to satisfy contingent requirements, without departing from the scope of the following claims. Each of the characteristics described as belonging to a possible embodiment can be made independently from the other embodiments described.

The invention claimed is:

1. A caliper body for a disc brake, comprising:

an elongated attachment side portion suitable for facing a first braking surface of a disc;

said disc defining an axial direction parallel to a rotation axis thereof, a circumferential direction parallel to one of its braking surfaces, a disc inlet portion corresponding to the section of the caliper the disc enters when travelling, and a radial direction perpendicular to the axial direction and to the circumferential direction, the radial direction defining an outward radial direction when facing away from the rotation axis of the disc;

said elongated attachment side portion comprising at least two attachment portions suitable for coupling the body of the caliper with a support thereof;

said attachment portions comprising an attachment portion facing the disc inlet portion of the body of the caliper, and an attachment portion arranged at the end of the disc outlet portion of the body of the caliper where the disk exits when rotating;

said caliper body comprising an elongated non-attachment side portion suitable for facing a second braking surface opposite the first braking surface of the disc;

each elongated portion having at least one cylinder suitable for receiving a piston for exerting a pressure on pads housed between said elongated portions of the caliper and said braking surfaces of the disc;

said caliper body also comprising at least one connection bridge arranged straddling the disc connecting the elongated attachment side portion with the elongated non-attachment side portion;

wherein said elongated portions have an outer surface opposite the disc substantially inclined and rounded towards the disc in the radially outward direction so that the caliper body observed in the circumferential direction has a bulk with a rounded outer surface, and wherein at least one end bridge located on the disc outlet portion, extends from the elongated attachment side portion near to an attachment portion towards the elongated non-attachment side portion, so that at least one attachment portion is arranged at a circumferential end of the elongated attachment side portion.

2. The caliper body of claim 1, said caliper body when viewed from above has an outer profile that extends beyond the attachment portion on the disc inlet portion in the circumferential direction moving away from the centre of the caliper towards the disc inlet portion to then close after having opened to connect the elongated non-attachment side portion forming a arched profile, towards the opposite attachment portion arranged at the disc outlet portion, avoiding extending in the circumferential direction beyond said disc outlet portion.

3. The caliper body of claim 2, wherein on the outer surface of the elongated portions there are reinforcement ribs that extend from the body of the caliper in the axial direction extending along the elongated portions in the circumferential direction reinforcing bottoms of said cylinders and having side recesses towards the centre of the caliper passing between one cylinder and the other.

4. The caliper body of claim 3, wherein the radially inner side of the elongated portions is shaped so as to follow the profile of the cylinders forming a lower recess between cylinders arranged housed in the same elongated portion.

5. The caliper body of claim 1, further comprising two end bridges connecting the elongated attachment side portion with the elongated non-attachment side portion near to their disc inlet portion and disc outlet portion.

6. The caliper body of claim 5, wherein, viewed towards the axis of the disc, the end bridges have a tapered outer profile that extends, when they move away from the attachment portions, rounding towards the centre of the caliper for their curved extension that, in at least one of the bridges is more than half of its overall extension in the axial direction.

7. The caliper body of claim 5, wherein towards the axis of the disc, the end bridges have an outer profile that starts to taper towards the centre of the caliper going from the elongated attachment side portion and in at least one of the bridges the profile starts to curve before reaching the middle of the caliper in the axial direction to then reach the elongated non-attachment side portion.

8. The caliper body of claim 1, further comprising a central bridge connecting the elongated attachment side portion with the elongated non-attachment side portion arranged substantially in connection with the middles of these elongated portions.

9. The caliper body of claim 8, wherein the caliper body comprises ducts for brake fluid inside the central bridge that, remaining in the arched profile, from a portion near to the centre of the caliper reach at least one chamber defined by a cylinder near to a bottom thereof.

10. The caliper body of claim 1, wherein, viewed towards the axis of the disc, the outer profile of the body of the caliper forms, with respect to its two attachment portions in extending to form the elongated non-attachment side portion, a rounded shape or outer profile.

11. The caliper body of claim 1, wherein outside of the elongated portions the caliper body comprises reinforcement ribs that extend in the circumferential direction along said elongated portions.

12. The caliper body of claim 1, comprising reinforcement ribs that taper in the circumferential direction moving away from the attachment portion arranged at the end of the elongated attachment side portion going towards the inlet portion.

13. The caliper body of claim 1, wherein each elongated portion comprises two cylinders suitable for receiving pistons.

14. The caliper body of claim 1, wherein the elongated portions and the bridges that connect them are shaped so as to leave substantial portions of the cylinders uncovered.

15. The caliper body of claim 1, wherein the body of the caliper, between the bridges connecting the elongated portions, has upper recesses in the elongated portions that highlight the shape of the cylinders in the upper or radially outer surface of the body of the caliper.

16. The caliper body of claim 1, wherein said elongated portions are connected by a central bridge that viewed circumferentially has a bulk with a rounded outer surface and wherein said central bridge with respect to a middle plane of the disc on which the body of the caliper is arranged so as straddle it is divided into two parts and wherein the part of the central bridge that connects to the elongated non-attachment side portion, in its radially outer surface, is undercut forming a recess suitable for making it easier to dismount the wheel of the vehicle.

* * * * *